United States Patent [19]

Jährig et al.

[11] Patent Number: 4,957,581
[45] Date of Patent: Sep. 18, 1990

[54] METHOD AND APPARATUS FOR CENTERING TUBES

[75] Inventors: Günter Jährig, Eggenstein-Leopoldshafen; Lutz Langenhahn, Ettlingen; Robert Riedl, Karlsruhe, all of Fed. Rep. of Germany

[73] Assignee: IWK Verpackungstechnik GmbH, Stutensee, Fed. Rep. of Germany

[21] Appl. No.: 291,586

[22] Filed: Dec. 29, 1988

[30] Foreign Application Priority Data

Dec. 29, 1987 [DE] Fed. Rep. of Germany ....... 3744402

[51] Int. Cl.⁵ .................. B65B 7/06; B65B 51/20; B65B 51/32
[52] U.S. Cl. ................. 156/309.9; 53/373; 53/477; 156/322; 156/497; 156/499; 493/134; 493/156; 493/192
[58] Field of Search ............. 156/497, 499, 309.9, 156/322; 53/477, 373; 493/134, 156, 191, 192, 308

[56] References Cited

U.S. PATENT DOCUMENTS

| | | | |
|---|---|---|---|
| 3,140,571 | 7/1964 | Dörper et al. | 53/373 |
| 3,825,408 | 7/1974 | Farfaglia et al. | 156/497 |
| 3,997,385 | 12/1976 | Osborne | 156/497 |
| 4,511,426 | 4/1985 | Linner | 156/497 |

Primary Examiner—Michael Wityshyn
Attorney, Agent, or Firm—Antonelli, Terry, Stout & Kraus

[57] ABSTRACT

To prevent an end of a filled container, upon heating by a hot air for subsequent welding of edges thereof, from coming into contact and sticking to a retainer, a centering gas such as, for example, air is supplied from an external source to the container end. Edges of the filling opening of the container are heated by a hot gas for a subsequent closing of the same through a nozzle introducible into the filling opening of the container end. A centering fluid is directed at the end of the container with a component of flow of the centering in an axial direction of the container to provide for a contact-free centering of the container end.

8 Claims, 1 Drawing Sheet

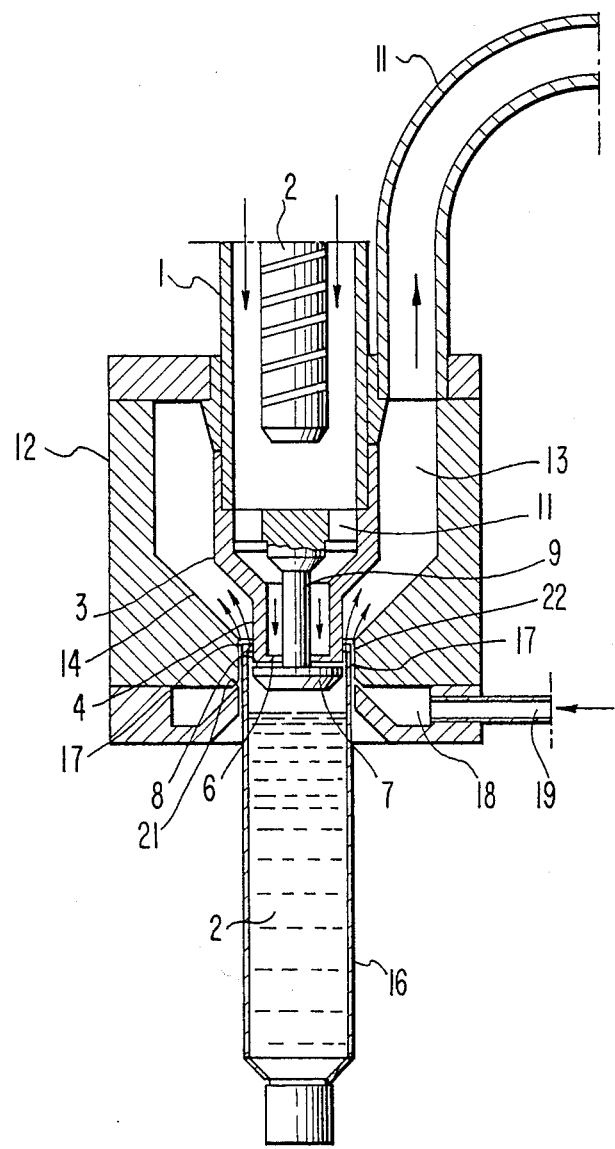

METHOD AND APPARATUS FOR CENTERING TUBES

BACKGROUND OF THE INVENTION

The invention relates to a method for centering a packing container, such as a tube in an apparatus for heating an open tube end by hot air for the subsequently welding or sealing the tube edges, as well as an apparatus for heating the edges of the filling opening of reception containers, such as tubes, by hot gas for the subsequent closing of the same, with a nozzle being introducable into the filling opening of the container end for the hot gas supply, and the opening bringing about a substantially radially outwardly directed gas discharge.

It is known to close the ends of containers, bounding filling openings and, in particular, tubes by hot air sealing or welding. Hot air is blown into the container end and heats the tube edge or rim. Subsequently the container end is compressed by the jaws of a closing station and is sealed by hot welding in a manner described, for example, in U.S. Pat. No. 4,511,426.

With an apparatus of the aforementioned type, hot air is introduced into the interior of the tube end and the latter is heated; however, their is a risk of the heated edges shrinking and of the surrounding holding or retaining ring sticking.

The aim underlying the invention essentially resides in preventing shrinking and sticking of the softened tube end on a holding or centering means.

According to the method of the present invention, the tube end is externally supplied centering gas, more particularly, air, with the apparatus of the present invention providing a contact-free centering means for the container end.

Contact-free centering is brought about in accordance with the present invention in that the container or tube end is externally supplied with air or inert gas, which does not have to be heated as opposed to the air introduced into the interior of the container end and, the externally supplied air or inert gas may be at room temperature or, for example, up to 50° C., so that no thermal energy has to be supplied to the outside. Furthermore, through the supply of air up to the indicated temperature, it is ensured that the container end is only heated and softened on the inside, whereas, the outside is kept relatively cooler, so that a shrinkage of the free container end, such as can occur in the state of the art, is reliably avoided. Nevertheless by the pressing jaws and softening in the interior of the container or tube end, the tube end can be closed by welding. Simultaneously the sticking of the outside of the tube to the centering means and to the pressing jaws carrying out the closing is prevented.

The contact-free centering brought about by centering gas leads to an increased tube flow rate or throughput, without any risk of the welded tubes bursting. The inventive construction obviates complicated adjustments and leads to a high degree of reliability and long service life.

According to preferred developments, the gas is forced into an annular clearance between the outer circumference of the tube end and a boundary wall surrounding the same in spaced manner. In addition, the centering gas, supplied from the outside, is supplied at a higher pressure than the hot gas introduced into the interior of the tube end. Due to the fact that the externally supplied centering air is at a lower overpressure than the externally supplied hot air, it is reliably avoided that hot air passes over the front edge of the tube end and onto the outside thereof, where it could lead to a shrinkage or damage to the tube varnish imprint. The overpressure may be low, and, for example, the overpressure of the externally supplied centering air may be about 0.1 bar and that of the hot air only about 0.05 bar.

According to further preferred developments of the invention, the nozzle surrounding the container end is provided with substantially radially inwardly directed gas outlet, with an inner contour of the nozzle opening being slightly larger than the outer contour of the container end. In particular the centering air nozzle has a directional component directed towards the container end and at the axial height of the hot air nozzle the container end is surrounded at a limited distance by a cylindrical wall area. Normally cylindrical ends of containers, particularly tubes are closed. However, prior to welding, the ends can also have a different shape, e.g. can be oval or elliptical in cross-section. In this case, the inner contour of the outer nozzle is adapted to the corresponding outer contour of the container end and surrounds the same with a small spacing. The same applies if, in preferred manner, the container end is surrounded at the axial height of the hot air nozzle and at a limited distance by a cylindrical wall area. Such an axially parallel wall is also adapted to the contour of the container end and surrounds the same at an adequate, but small distance of, for example, 0.5 mm. Preferably the centering air nozzle is at a smaller axial distance from the closed side of the container than the hot air nozzle. As a result the centering air supplied from the outside passes over the end over an adequate area for centering purposes and in particular comes into contact with the container exterior and centering takes place below the supply plane of the hot air melting the container edge.

BRIEF DESCRIPTION OF THE DRAWINGS

Further advantages and features of the invention can be gathered from the following description of a non-limitative embodiment when taken in connection with the attached drawing, wherein:

The Single FIGURE is an axial cross-sectional view of an apparatus for centering tubes constructed in accordance with the present invention.

DETAILED DESCRIPTION

The inventive apparatus for heating the ends of containers, such as tubes, for the subsequent welding or sealing of ends thereof, is provided, in a known manner, with a guide pipe 1 for hot gas, and more particularly, hot air. The guide pipe 1 contains a heating element 2 for heating the air supplied. The guide pipe 1 tapers, in a lower region thereof over a sloping shoulder 3 to a cylindrical end 4 with a frontal opening 6. Opening 6 is covered by a shielding cone 7 in such a way that a narrow annular clearance or gap is provided between the opening 6 and shielding cone 7 for defining a hot air ring nozzle 8. Shielding cone 7 is fixed in the interior of guide pipe 1 by a rod 9 and radial ribs 11. Optionally, the hot air nozzle 8 can be adjustable, in that, for example, the rod 9 for the shielding cone 7 is adjustable in spindle-like manner in its mounting support, so as to enable an adjustment of the distance from shielding cone 7 to the front of the cylindrical end 4. The thickness of the gap or clearance defining the hot air ring nozzle 8 may be 0.5 to 2 mm with a setting dependent upon the construction of the packing means, particularly of a tube and the heat quantity necessary for adequate heating purposes.

To the guide pipe 1 is connected an external casing 12, which has a spent air chamber 13 connected to a spent air discharge tube 11. The inner casing wall surrounding chamber 13 tapers over an area 14 to a cylindrical wall 17 adapted to the outer contour of the packing means 16, such as a tube to be filled with an axially parallel extension. Below the casing 12 is formed a centering air chamber 18, which has a lateral centering air supply 19 and is opened by an inwardly directed ring nozzle 21 issuing below the wall 17 and having a component directed towards the same. With a packing means 16 such as a tube with a circular cross-section, the external diameter of the cylindrical end 4 is smaller than the internal diameter of the tube. The surrounding cylindrical wall 17 of the inner casing wall surrounding chamber 13 is located on a radius exceeding that of the tube, so that, for example, a 0.5 mm gap is formed between the tube and the cylindrical wall 17. Ring nozzle 21 has a smaller gap of 0.05 mm, with the ring nozzle beiung axially displaceable with respect to the hot air ring nozzle 8, as can be gathered from the drawing.

For heating the open filling end 22 of the tube the tube containing the filling material, is introduced with the open filling end 22 into the annular clearance between cylindrical wall 17, and the cylindrical end 4 or shielding cone 7 of the inventive apparatus is passed over the filling end 22 of tube 16. Air is then blown past the heating element 2 to the hot air ring nozzle 8, which is heated by heating element 2. The temperature is in the range 300° to 450° C., as a function of the material used for the tube to be heated.

Air passes through the hot air ring nozzle 8 and flows past the open filling end 22 of tube 16 and heats the same, particularly on the inside thereof. Simultaneously the tube 16 is centered by centering air supplied to its outside via the centering air supply 19, centering air chamber 18 and ring nozzle 21, in such a way that the open filling end 22 is kept spaced from the surrounding cylindrical centering wall 17 by the supplied centering air. The centering air is preferably supplied at a higher pressure than the hot air and, for example, the centering air is supplied with an overpressure of 0.1 bar and the hot air with an overpressure of 0.05 bar thereby ensuring that the open filling end 22 heated by the hot air does not came into contact with the surrounding centering ring with the cylindrical wall 17, so as to stick thereto or lead to dirty marks.

Following adequate heating of the open filling end 22 of tube 16 into the range of the melting temperature of the tube material of 100° to 150° C., the represented apparatus is removed or the tube 16 is removed therefrom. Then, in a known manner, jaws of a closing station (not shown) engage on the open filling end 22 and press same together, so that the regions of the filling end 22 are welded together and the tube is reliably closed.

We claim:

1. An apparatus for heating edges of a filling opening of a packing container by hot gas for a subsequent closing of the filling opening, with a nozzle means being introducible into the filling opening at a container open end for supplying the hot gas by a substantially radially outwardly directed gas discharge, characterized in that centering means are provided for centering the container open end without contacting the container open end including means disposed externally of the container at a position spaced axially forward of the nozzle means, as viewed in a direction of a closed end of the container, for directing a centering fluid at the container open end with a component of flow of the centering fluid in an axial direction of the container.

2. An apparatus according to claim 1, characterized in that the means for directing includes a centering nozzle surrounding the container open end for providing a substantially radially inwardly directed gas discharge, and in that the centering nozzle has an opening with an inner contour slightly larger than an outer contour of the container open end.

3. An apparatus according to one of claims 1 or 2, characterized in that the centering fluid is supplied at a higher pressure than the hot gas.

4. An apparatus according to one of claims 1 or 2, characterized in that the container open end at a level of the container at which the nozzle means is disposed is surrounded by a cylindrical wall means with a predetermined spacing between the container open end and the cylindrical wall means, for directing the component of flow of the centering gas in the axial direction of the container.

5. An apparatus according to one of claims 1 or 2, characterized in that the centering nozzle is constructed as a ring nozzle.

6. An apparatus according to one of claim 1 or 2, wherein the packing container is a tube.

7. An apparatus according to one of claims 1 or 2, wherein the centering fluid is air.

8. A method for centering a packing container in a device for heating an open end of the packing container by supplied hot air for enabling a subsequent welding of edges of the open end of the container, the method comprising the step of supplying a centering gas from an external source to the exterior of the open end of the container from a position disposed forwardly, as viewed in a direction of a closed end of the container, of a point of location of the supply of hot air, and directing the centering gas so as to provide for a component of flow of the centering gas in an axial direction of the container.

* * * * *